(12) United States Patent
Ohara et al.

(10) Patent No.: US 11,219,068 B2
(45) Date of Patent: Jan. 4, 2022

(54) USER EQUIPMENT, BASE STATION, AND RANDOM ACCESS METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/609,617

(22) PCT Filed: May 2, 2017

(86) PCT No.: PCT/JP2017/017310
§ 371 (c)(1),
(2) Date: Oct. 30, 2019

(87) PCT Pub. No.: WO2018/203411
PCT Pub. Date: Nov. 8, 2018

(65) Prior Publication Data
US 2020/0154484 A1    May 14, 2020

(51) Int. Cl.
*H04W 74/08* (2009.01)
*H04L 27/26* (2006.01)

(52) U.S. Cl.
CPC ..... *H04W 74/0833* (2013.01); *H04L 27/2626* (2013.01)

(58) Field of Classification Search
CPC .............. H04W 74/00; H04W 74/0833; H04L 27/2626
See application file for complete search history.

(56) References Cited

U.S. PATENT DOCUMENTS

| 8,553,590 B2 | 10/2013 | Baldemair et al. |
| 2009/0175292 A1 | 7/2009 | Noh et al. |
| 2017/0280481 A1* | 9/2017 | Stern-Berkowitz ........... H04W 74/0833 |
| 2018/0220450 A1* | 8/2018 | Aiba ................ H04W 74/0446 |
| 2018/0270868 A1* | 9/2018 | Ou ........................ H04W 72/042 |
| 2019/0104549 A1* | 4/2019 | Deng .................. H04B 7/0617 |
| 2019/0104551 A1* | 4/2019 | Deenoo ............. H04W 72/0453 |

OTHER PUBLICATIONS

Office Action issued in the counterpart Japanese Patent Application No. 2019-516347, dated May 26, 2020 (5 pages).
LG Electronics; "Discussion on NR PRACH Preamble"; 3GPP TSG RAN WG1 Meeting #88bis, R1-1704868; Spokane, USA; Apr. 3-7, 2017 (13 pages).
3GPP TS36.211 V14.2.0; ,"3rd Generation Partnership Project; Technical Specification Group Radio Access Network; Evolved Universal Terrestrial Radio Access (E-UTRA); Physical channels and modulation (Release 14)," Mar. 2017 (154 pages).

(Continued)

*Primary Examiner* — Jamal Javaid
*Assistant Examiner* — Ryan C Kavleski
(74) *Attorney, Agent, or Firm* — Osha Bergman Watanabe & Burton LLP

(57) ABSTRACT

A terminal is disclosed including a processor and a transmitter. The processor selects one of a first table and a second table based on a frequency band, wherein the first table and the second table include candidate parameters that are used for random access. The transmitter transmits a preamble using the selected table.

7 Claims, 6 Drawing Sheets

(56) References Cited

OTHER PUBLICATIONS

International Search Report issued in corresponding International Application No. PCT/JP2017/017310; dated Jun. 13, 2017 (5 pages).
Written Opinion of the International Searching Authority issued in corresponding International Application No. PCT/JP2017/017310; dated Jun. 13, 2017 (5 pages).
Office Action issued in the counterpart Australian Patent Application No. 2017412687, dated Aug. 11, 2020 (4 pages).
Motorola Mobility et al; "PRACH for an NR carrier supporting multiple numerologies"; 3GPP TSG RAN WG1 Meeting #88, R1-1703045; Athens, Greece; Feb. 13-17, 2017 (3 pages).
Extended European Search Report issued in counterpart European Patent Application No. 17908417.3, dated Oct. 6, 2020 (7 pages).
Intel Corporation; "NR PRACH preamble design"; 3GPP TSG RAN WG1 #88bis, R1-1704714; Spokane, USA; Apr. 3-7, 2017 (9 pages).
Nokia Alcatel-Lucent Shanghai Bell; "NR Physical Random Access Channel"; 3GPP TSG-RAN WG1 #88bis, R1-174942; Spokane, USA; Apr. 3-7, 2017 (47 pages).
Office Action issued in the counterpart Indian Patent Application No. 201937046453, dated Feb. 19, 2021 (5 pages).

\* cited by examiner

USER EQUIPMENT, BASE STATION, AND RANDOM ACCESS METHOD

TECHNICAL FIELD

The present invention relates to user equipment, a base station, and a random access method.

BACKGROUND ART

A communication standard (5G or NR) that is the next generation of LTE (Long Term Evolution) and LTE-Advanced has been discussed in 3GPP (Third Generation Partnership Project). Similar to LTE, etc., it is assumed that, for establishing a connection or for reconnecting between user equipment (UE: User Equipment) and a base station (eNB or eNodeB), random access is performed in a NR system.

During random access of LTE and LTE-Advanced, the user equipment UE transmits a preamble (PRACH preamble) selected from a plurality of preambles prepared within a cell. In response to detecting a preamble, the base station eNB transmits an RAR (RACH response), which is the response information. The user equipment UE that receives the RAR transmits an RRC Connection Request, as a message 3. After receiving the message 3, the base station eNB transmits an RRC Connection Setup including cell configuration information, etc., for establishing a connection, as a message 4. After detecting that the message 4 includes its own UE ID, the user equipment UE completes the random access process and establishes a connection.

In random access, a channel for initially transmitting a preamble is referred to as a physical random access channel (PRACH: Physical Random Access Channel), and configuration information on the PRACH (PRACH Configuration) is signaled from the base station eNB to the user equipment UE by an index. Namely, the user equipment UE selects a PRACH resource based on the PRACH Configuration signaled from the base station eNB.

Additionally, the PRACH Configuration corresponds to a preamble format; and the user equipment UE transmits a preamble using a preamble format corresponding to the PRACH Configuration (cf. Non-Patent Document 1).

RELATED ART DOCUMENT

Non-Patent Document

Non-patent Document No. 1: 3GPP TS36.211 V14.2.0 (2017-03)

SUMMARY OF THE INVENTION

Problem to be Solved by the Invention

In NR, it is assumed that various frequency bands are available, and a case is assumed in which parameters that differ depending on a cell, such as subcarrier spacing and a cyclic prefix (CP: Cyclic Prefix) length, are used, so as to effectively utilize characteristics of the various frequency bands. For example, optimum subcarrier spacing differs depending on a frequency band because the Doppler effect, a residual frequency offset, and so forth differ for each frequency band. For example, efficiency can be enhanced by using small subcarrier spacing for wide coverage (i.e., when the CP length is large). As described above, the optimum subcarrier spacing differs depending on the assumed coverage for each frequency band. For example, if a slot length at a high frequency band is 0.125 ms (i.e., if the subcarrier spacing is 120 kHz), the efficiency can be enhanced by using large subcarrier spacing for the PRACH. As described above, the optimum subcarrier spacing differs depending on the slot size, etc., used for data communication for each frequency band. Additionally, for example, in order to compensate for a path-loss at a high frequency band, by arranging a base station so that a large number of narrow receiving beams can be configured, receiving beams that are repeated within a preamble and that differ for each symbol can be applied for receiving the PRACH. As described above, an optimum symbol repetition number per preamble differs depending on the frequency band because the number of receiving beams at the base station assumed for each frequency band differs.

If a preamble format or a PRACH Configuration is defined corresponding to the assumed plurality of types of subcarrier spacing, the assumed plurality of CP lengths, and so forth, the combinations of the parameters in the preamble format or the PRACH Configuration increase, and the overhead for signaling the preamble format or the PRACH Configuration increases.

Even if a preamble format or a PRACH Configuration is defined corresponding to the assumed plurality of types of subcarrier spacing, the assumed plurality of CP lengths, and so forth, as the optimum subcarrier spacing, the optimum CP length, and so forth differ depending on the frequency band, it is not reasonable to use all preamble formats or PRACH configurations in testing between the user equipment and the base station, which causes an increase in the test items.

An object of the present invention is to reduce an overhead for signaling a random access parameter or to reduce the testing when the random access parameter differs depending on the frequency band.

Means to Solve the Problem

User equipment according to an aspect of the present invention includes a configuration information storage that stores candidates of a preamble format or candidates of random access configuration information that are defined depending on a frequency band; a receiver that receives, from a base station, an indication of a preamble format or random access configuration information to be used for random access with the base station; and a random access controller that selects, from the configuration information storage, the candidates of the preamble format or the candidates of the random access configuration information to be used for the random access with the base station, and that starts the random access using, among the selected candidates, the preamble format or the random access configuration information corresponding to the indication.

Advantageous Effects of the Invention

According to the present invention, when the random access parameter differs depending on the frequency band, the overhead for signaling the random access parameter can be reduced or the testing can be reduced.

EMBODIMENTS OF THE INVENTION

Figure 1:
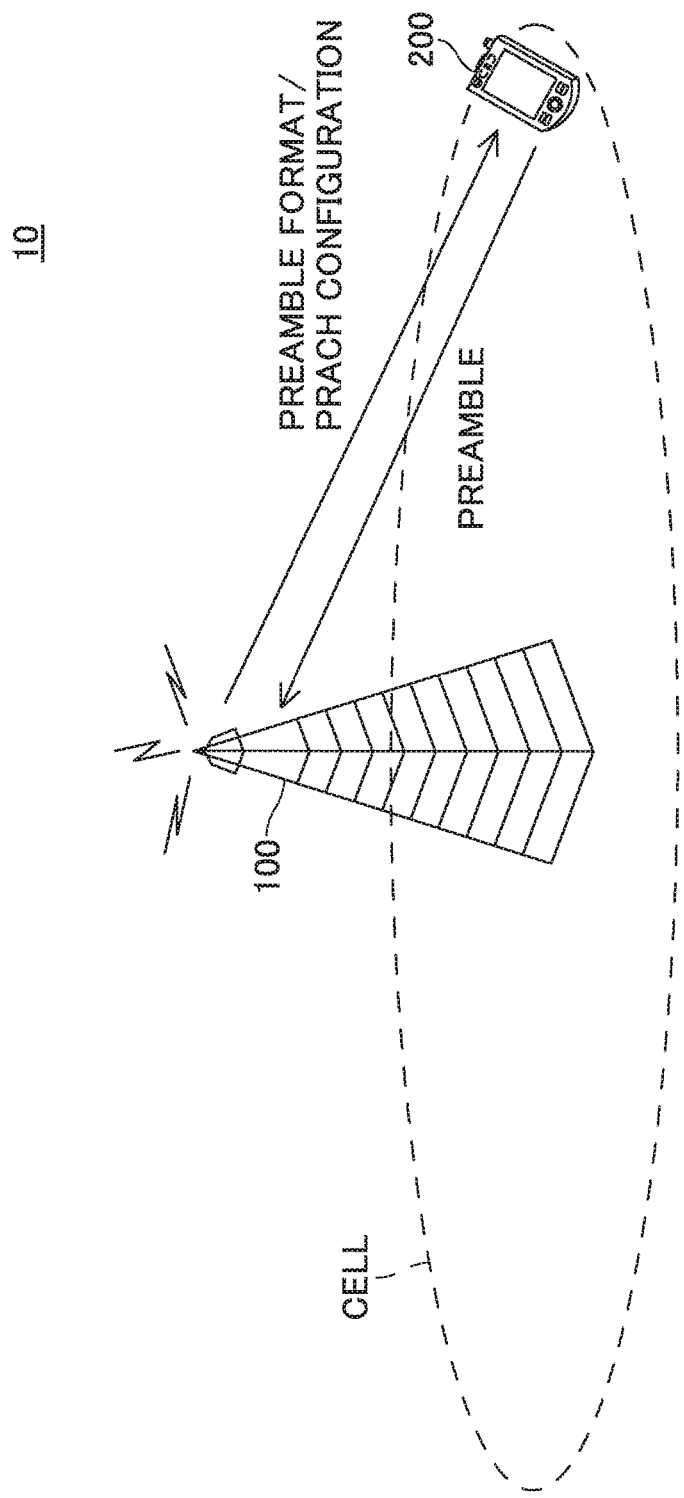
FIG. 1 is a diagram illustrating random access in a radio communication system according to an embodiment of the present invention.

In the following, an embodiment of the present invention is described by referring to the drawings. Note that, the embodiment described below is merely an example, and embodiments to which the present invention is applied are not limited to the following embodiment.

In the embodiment, the description is provided using terms defined in LTE, as appropriate. Additionally, for operation of a radio communication system, existing technology specified in LTE can be used, as appropriate. However, the existing technology is not limited to LTE. The "LTE" used in this specification is used in broad meaning including LTE-Advanced and systems according to on and after LIE-Advanced, unless as specified otherwise. Furthermore, the present invention can be applied to a system other than LTE to which the random access is applied.

Further, terms which are used in existing LTE, such as RACH, a preamble, PRCH Configuration, and a preamble format, are used in the embodiment; however, this is for convenience of the description, and signals and functions, etc., similar to these may be called by other names.

<Overview of the Radio Communication System>

FIG. 1 is a configuration diagram of the radio communication system 10 according to the embodiment. As depicted in FIG. 1, the radio communication system 10 according to the embodiment includes base stations 100; and user equipment 200. In the example of FIG. 1, a single base station 100 and a single unit of user equipment 200 are depicted; however, a plurality of base stations 100 may be provided, or a plurality of units of user equipment 200 may be provided. Here, the base station 100 may be referred to as the BS, and the user equipment 200 may be referred to as the UE.

The base station 100 is capable of accommodating one or more (e.g., three) cells (which may also be referred to as sectors). When the base station 100 accommodates a plurality of cells, the whole coverage of the base station 100 can be divided into a plurality of smaller areas; and, in each smaller area, a communication service can be provided by a base station subsystem (e.g., an indoor small base station RRH: Remote Radio Head). The term "cell" or "sector" refers to a part of or the whole coverage area of the base station and/or the base station subsystem that provides the communication service in the coverage. Furthermore, the tams "base station," "eNB," "cell," and "sector" can be used interchangeably in this specification. The base station 100 may also be referred to by the terms, such as a fixed station, a Node B, an eNodeB (eNB), an access point, a femtocell, and a small cell.

The user equipment 200 may be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a hand set, a user agent, a mobile client, a client, or some other suitable terms, by a person ordinarily skilled in the art.

The user equipment 200 is capable of communicating with the base station 100 using one or more frequency bands. In the embodiment, parameters, such as subcarrier spacing, may differ depending on the frequency band. The parameters that differ depending on the frequency band include one or more of, for example, the subcarrier spacing, the CP length, a preamble sequence length, a preamble sequence pattern (e.g., whether a Zadoff-Chu sequence is used or another sequence is used), a repetition number of the OFDM symbol, a repetition number of the preamble (CP+OFDM symbol), and so forth. These parameters are signaled from the base station 100 to the user equipment 200 as a preamble format and/or random access configuration information (which is referred to as the PRACH Configuration). The above-described parameters may be signaled in the preamble format, or may be signaled in the PRACH Configuration. For example, the preamble sequence length, the subcarrier spacing, and so forth may be signaled in the preamble format; and the other parameters may be signaled in the PRACH Configuration.

Furthermore, the PRACH Configuration may include one or more of a time/frequency resource position used for the PRACH; a resource number for each time/frequency; and spacing between resources when a plurality of time/frequency resources exists. The PRACH Configuration and the preamble format may be separately signaled, or, the PRACH Configuration may include the preamble format. The user equipment 200 transmits the preamble in accordance with the preamble format and/or the PRACH Configuration signaled from the base station 100.

As the number of the parameters that differ depending on the frequency band increases, the overhead for signaling the parameters increases, and the test items between the base station 100 and the user equipment 200 increase. Thus, in the following, (1) an efficient parameter signaling method and (2) an efficient testing method for the random access procedure according to the embodiment are described.

(1) Efficient Parameter Signaling Method

Figure 2:
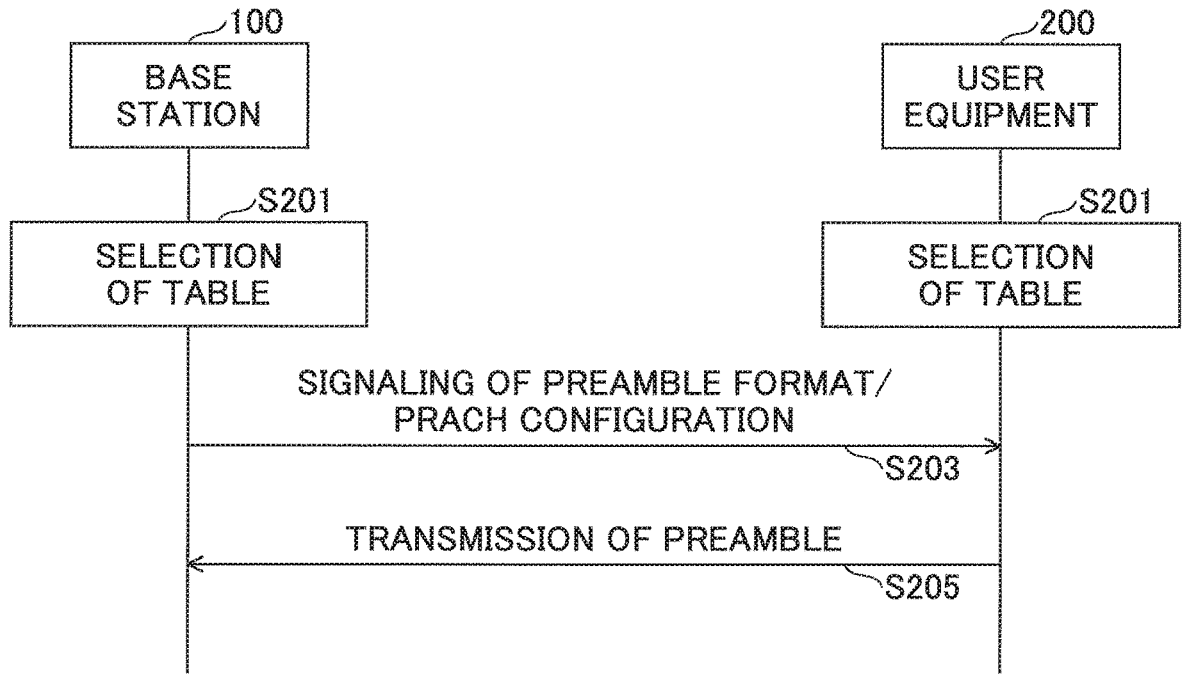
FIG. 2 is a sequence diagram illustrating a random access procedure in the radio communication system according to the embodiment of the present invention.

In the following, a procedure is described that is for the user equipment 200 to receive parameters from the base station 100 in order for the user equipment 200 to start the random access procedure with the base station 100. FIG. 2 is a sequence diagram illustrating a random access procedure in the radio communication system according to the embodiment of the present invention.

Each of the base station 100 and the user equipment 200 defines candidates of the preamble format and/or candidates of the PRACH Configuration that can be used depending on the frequency band, which are to be stored as a table, for example. The table may be defined, in advance, within the system based on a specification; or the table may be signaled from the base station 100 to the user equipment 200. Note that the format to be stored is not required to be a table format, and the format to be stored may be a list format in which only a part of the parameters (e.g., the subcarrier spacing) is defined depending on the frequency band. In the following, a specific example is described by exemplifying the table format.

Figure 3:
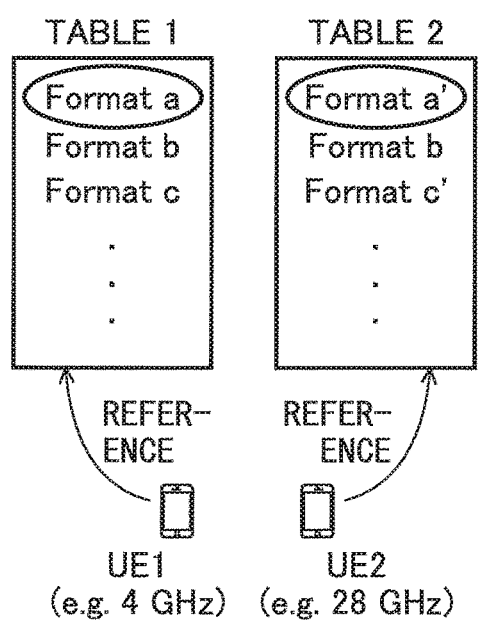
FIG. 3 is a schematic diagram illustrating tables of preamble formats defined depending on a frequency band.

For example, as illustrated in FIG. 3, each of the base station 100 and the user equipment 200 stores the candidates for the preamble format to be used in a low frequency band as a table 1, and stores the candidates for the preamble format to be used in a high frequency band as table 2. As described above, the preamble format may include one or more of the subcarrier spacing; the CP length; the preamble sequence length; the preamble sequence pattern; the repetition number of the OFDM symbol; the repetition number of the preamble; and so forth. Additionally, an index indicating a pattern of the preamble format may be included. For example, as a specific example of the preamble format, (A) a combination of the preamble sequence length=839 and the subcarrier spacing=1.25 kHz, 2.5 kHz, or 5 kHz; (B) a combination of the preamble sequence length=139 and the subcarrier spacing=7.5 kHz, 15 kHz, 30 kHz, 60 kHz, or 120 kHz; and (C) a combination of the preamble sequence length=71 and the subcarrier spacing=15 kHz, 30 kHz, 60 kHz, 120 kHz, or 240 kHz may be used. In this specific example, if one subcarrier spacing is selected for each of the preamble sequence lengths of the cases (A), (B), and (C), the indexes for the three patterns, respectively, may be provided because there are three patterns of the combinations. Note that, for each preamble sequence length, a plurality of types of subcarrier spacing may be selected. Additionally, a preamble format may be used that specifies a combination of parameters of the CP length, the repetition number of the OFDM symbol, and the subcarrier spacing, which are used in LTE.

The base station 100 and the user equipment 200 respectively select whether the table 1 shown in FIG. 3 is used or the table 2 shown in FIG. 3 is used (S201). The selection of the table may be determined depending on the frequency band in which the user equipment 200 communicates with the base station 100; or the selection of the table may be signaled from the base station 100 to the user equipment 200 as the broadcast information, etc. For example, the UE 1 that communicates in the 4 GHz band uses the table 1, and the UE 2 that communicates in the 28 GHz band uses the table 2. As the candidates of the preamble format, different formats, such as Format a and Format a', may be configured depending on the frequency band; or a same format, such as Format b, may be configured for a plurality of frequency bands. Additionally, the number of the tables may be optionally configured; and, for example, three or more tables may be used. Furthermore, the correspondence between the frequency band and the table may be optionally configured. For example, three tables may be defined; the table 1 may be used for the range from 2 GHz to 10 GHz; the table 2 may be used for the range from 10 GHz to 20 GHz; and the table 3 may be used for 20 GHz or higher. The correspondence between the frequency band and the table may be defined, in advance, within the system by a specification; or may be signaled from the base station 100 to the user equipment 200 using broadcast information, the RRC RRC (Radio Resource Control) signaling, the downlink control information (DCI: Downlink Control Information), etc.

Figure 4:
FIG. 4 is a schematic diagram illustrating tables of PRACH Configurations defined depending on the frequency band.
Figure 4:

As illustrated in FIG. 4, as for the PRACH Configuration, similarly, the base station 100 and the user equipment 200 store the candidates of the PRACH Configuration used for the low frequency band as the table 1, and store the candidates of the PRACH Configuration used for the high frequency band as the table 2. As described above, the PRACH Configuration may include one or more of the time/frequency resource position used for the PRACH; the resource number for each time/frequency; the spacing between the resources when the plurality of time/frequency resources exists; the subcarrier spacing; the CP length; the preamble sequence length; the preamble sequence pattern; the repetition number of the OFDM symbol; the repetition number of the preamble; and so forth. Furthermore, the PRACH Configuration may include the preamble format. Additionally, an index indicating a pattern of the PRACH Configuration may be included.

The base station 100 and the user equipment 200 each select whether the table 1 shown in FIG. 4 is used or the table 2 shown in FIG. 4 is used (S201). The selection of the table may be determined depending on the frequency band in which the user equipment 200 communicates with the base station 100; or the selection of the table may be signaled from the base station 100 to the user equipment 200 as the broadcast information, etc. For example, the UE 1 that communicates in the 4 GHz band uses the table 1, and the UE 2 that communicates in the 28 GHz band uses the table 2. As the candidates of the PRACH Configuration, different formats, such as Config a and Config a', may be configured depending on the frequency band; or a same format, such as Config b, may be configured for a plurality of frequency bands. Additionally, the number of the tables may be optionally configured; and, for example, three or more tables may be used. Furthermore, the correspondence between the frequency band and the table may be optionally configured. For example, three tables may be defined; the table 1 may be used for the range from 2 GHz to 10 GHz; the table 2 may be used for the range from 10 GHz to 20 GHz; and the table 3 may be used for 20 GHz or higher. The correspondence between the frequency band and the table may be signaled from the base station 100 to the user equipment 200 using broadcast information, the RRC (Radio Resource Control) signaling, the downlink control information (DCI: Downlink Control Information), etc.

The base station 100 determines the preamble format to be used for the random access with the user equipment 200 from the candidates of the preamble format included in the table selected depending on the frequency band, and transmits an indication of the determined preamble format (S203). Similarly, the base station determines the PRACH Configuration to be used for the random access with the user equipment 200 from the candidates of the PRACH Configuration included in the table selected depending on the frequency band, and transmits the indication of the determined PRACH Configuration (S203). For example, the base station 100 selects the Format a from the table 1 of the preamble format for a UE 1 that communicates in the 4 GHz band; thus, an indication of the Format a is transmitted to the UE 1. Additionally, the base station 100 may select the Format a' from the table 2 of the preamble format for a UE 2 that communicates in the 28 GHz band; thus, an indication of the Format a is transmitted to the UE 2, instead of the Format a'. Additionally, identical indexes may be attached to the Format a and Format a', and the base station 100 may transmit indications of the preamble formats using the index. Similarly, the base station 100 selects the Config a from the table 1 of the PRACH Configuration for a UE 1 that communicates in the 4 GHz band; thus, an indication of the Config a is transmitted to the UE 1. Additionally, the base station 100 may select the Config a' from the table 2 of the PRACH Configuration for a UE 2 that communicates in the 28 GHz band; thus, an indication of the Config a may be transmitted to the UE 2, instead of the Config a'. Additionally, identical indexes may be attached to the Config a and the Config a', and the base station 100 may transmit indications of the PRACH Configurations using the index. Here, the PRACH Configuration and the preamble format may be separately signaled, or the PRACH Configuration may include the preamble format.

The user equipment 200 starts the random access using the preamble format and/or the PRACH Configuration, from the table selected depending on the frequency band or the table selected by the signaling from the base station, corresponding to the indication (S203) from the base station (S205). For example, the UE 1 that communicates in the 4 GHz band transmits the preamble using the Format a/the Config a from the table 1 corresponding to the indication of the Format a/the Config a from the base station 100. Furthermore, for example, the UE 2 that communicates in the 28 GHz band transmits the preamble using the Format a'/the Config a' from the table 2 corresponding to the indication of the Format a from the base station 100. Subsequently, with respect to the random access started by the user equipment 200 using the preamble format and/or the PRACH Configuration indicated to the user equipment 200, the base station 100 transmits the RAR to the user equipment 200, and the communication with the base station 100 is established by transmitting, from the user equipment 200, a connection request to the base station 100.

(2) Efficient Testing Method

In FIG. 3 and FIG. 4, the examples are described in which the tables are defined depending on the frequency band; however, they can be combined into one table for all frequency bands. Namely, the base station 100 and the user equipment 200 define candidates of the preamble format and/or candidates of the PRACH Configuration that can be used in a plurality of frequency bands, and store them as one table, for example. At this time, in order to reduce the test items between the base station 100 and the user equipment 200, a table may be defined that is used depending on the frequency band during testing. The table that is used depending on the frequency band may be defined, in advance, by a specification of the testing within the system.

Figure 5:
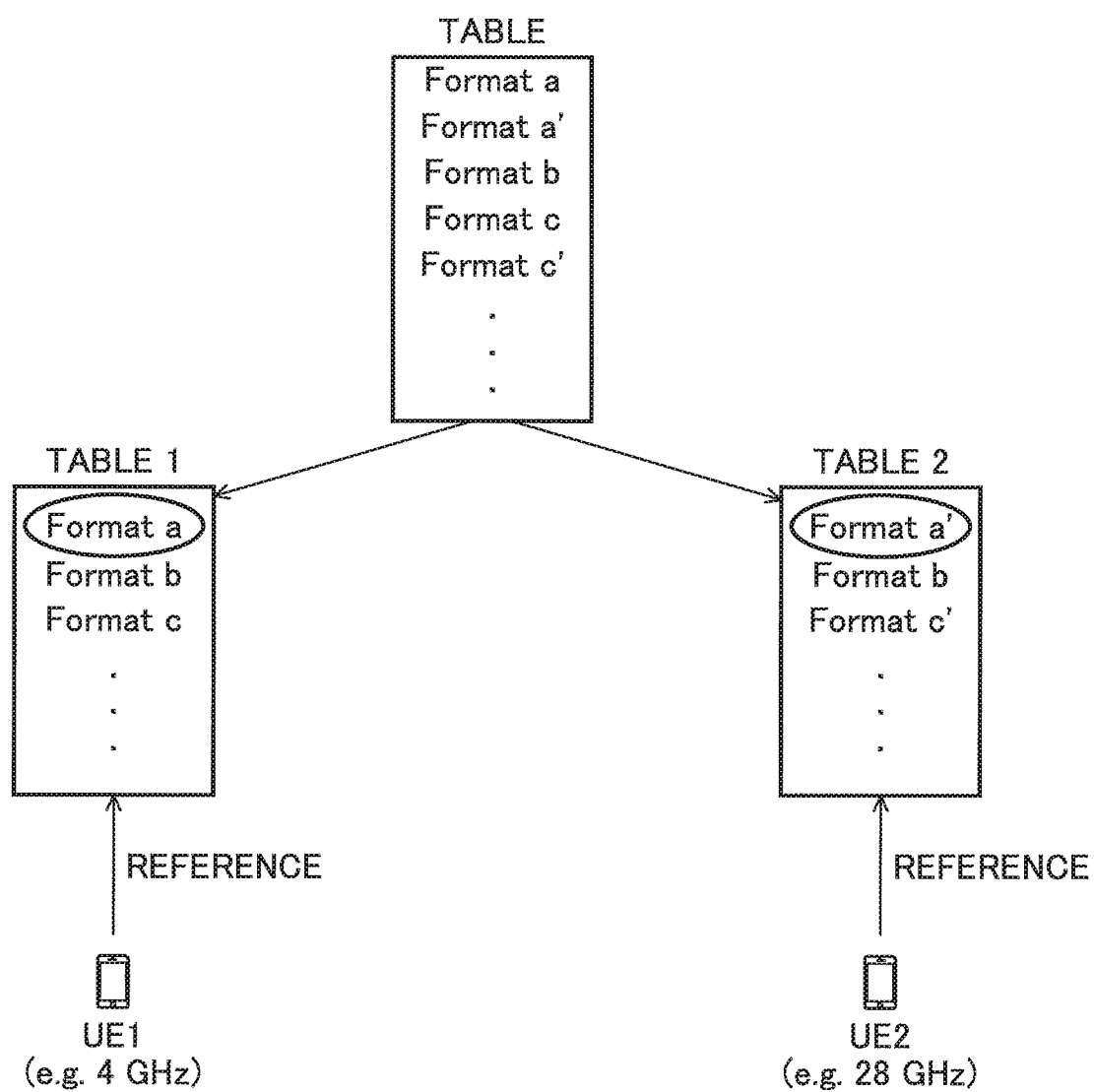
FIG. 5 is a schematic diagram illustrating the tables of the preamble formats used depending on the frequency band during testing.

As illustrated in FIG. 5, a combination enabling use in all frequency bands (e.g., Format a, Format a', Format b, Format c, Format c', . . . ) is defined as the preamble formats that can be used between the base station 100 and the user equipment 200. For the user equipment that is tested in the 4 GHz band, a table appropriate for the 4 GHz band (Format a, Format b, Format c, . . . ) is defined to be used. Additionally, for the user equipment that is tested in the 28 GHz band, a table appropriate for the 28 GHz band (Format a', Format b, Format c', . . . ) is defined to be used. The same applies to the PRACH Configuration. In FIG. 5, in addition to the table including the combination enabling use in all frequency bands, the table 1 and the table 2 are separately defined; however, the table 1 and the table 2 may not be separately defined, if the information about the frequency bands is included in the table of the combination enabling used in all frequency bands.

The testing procedure for the random access between the base station and the user equipment is described by referring to FIG. 2. First, the base station 100 selects whether the table 1 shown in FIG. 5 is used or the table 2 shown in FIG. 5 is used (S201). Additionally, the user equipment 200 may select whether the table 1 is used or the table 2 is used. The selection of the table may be determined depending on the frequency band in which the user equipment 200 communicates with the base station 100; or may be signaled from the base station 100 to the user equipment 200 as the broadcast information, etc.

The base station 100 determines the preamble format and/or the PRACH Configuration to be used for the random access with the user equipment 200 from the candidates of the preamble format and/or the candidates of the PRACH Configuration included in the table selected depending on the frequency band, and transmits an indication of the determined preamble format and/or PRACH Configuration (S203). For example, the base station 100 selects the Format a from the table 1 of the preamble format for a UE 1 that communicates in the 4 GHz band; thus, an indication of the Format a is transmitted to the UE 1. Additionally, the base station 100 selects the Format a' from the table 2 of the preamble format for a UE 2 that communicates in the 28 GHz band; thus, an indication of the Format a' is transmitted to the UE 2.

The user equipment 200 starts the random access using the preamble format and/or the PRACH Configuration corresponding to the indication (S203) from the base station (S205). Subsequently, with respect to the random access started by the user equipment 200 using the preamble format and/or the PRACH Configuration indicated to the user equipment 200, the base station 100 transmits the RAR to the user equipment 200, and the user equipment 200 establishes the connection with the base station 100 by transmitting a connection request to the base station 100.

<Functional Configuration of the Base Station>

Figure 6:
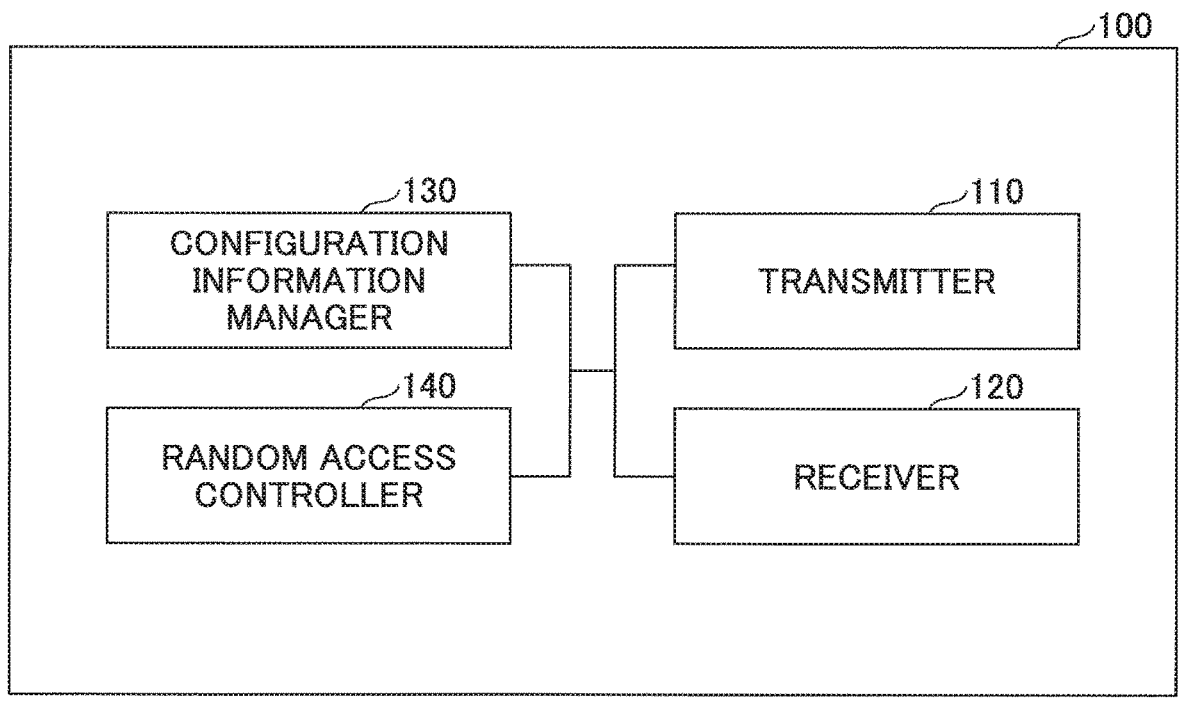
FIG. 6 is a block diagram illustrating an example of a functional configuration of a base station.

FIG. 6 is a diagram illustrating an example of a functional configuration of the base station 100. The base station 100 includes a transmitter 110; a receiver 120; a configuration information manager 130; and a random access controller 140. Note that the names of the functional units used in FIG. 6 are merely examples, and other names may be used.

The transmitter 110 is configured to generate a lower layer signal from higher layer information, and to wirelessly transmit the signal. The receiver 120 is configured to wirelessly receive various types of signals, and to retrieve higher layer information from a received signal.

The configuration information manager 130 stores configuration information that is configured in advance, and determines and retains the configuration information (preamble format table and/or PRACH Configuration table, preamble format used for random access and/or PRACH Configuration, etc.) to be dynamically and/or semi-statically configured for the user equipment 200. The configuration information manager 130 transfers, to the transmitter 110, the configuration information to be dynamically and/or semi-statically configured for the user equipment 200, and causes the transmitter 110 to transmit the configuration information.

The random access controller 140 controls a random access procedure with the user equipment 200. The random access controller 140 attempts to detect a preamble transmitted from the user equipment 200 based on the configuration information. Upon detecting the preamble, the random access controller 140 causes the transmitter 110 to transmit the RAR; and, upon receiving the RRC Connection Request from the user equipment 200, the random access controller 140 causes the transmitter 110 to transmit the RRC Connection Setup.

<Functional Configuration of the User Equipment>

Figure 7:
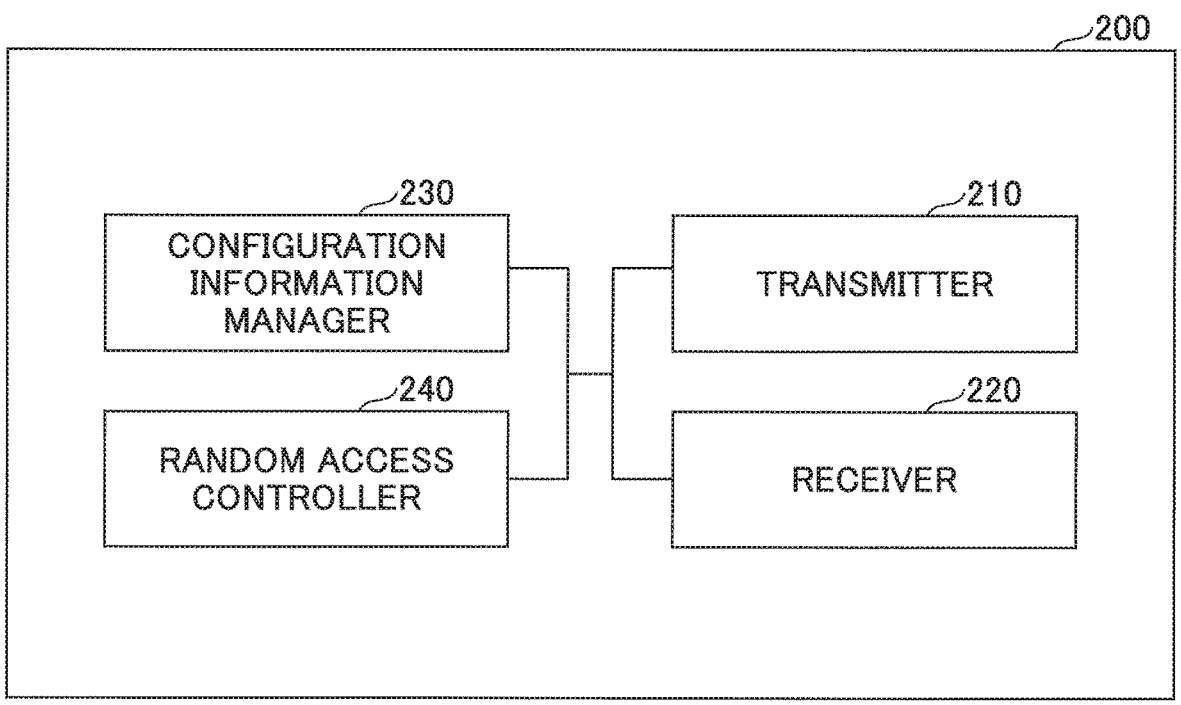
FIG. 7 is a block diagram illustrating an example of a functional configuration of user equipment.

FIG. 7 is a diagram illustrating an example of a functional configuration of the user equipment 200. The user equipment 200 includes a transmitter 210; a receiver 220; a configuration information manager 230; a random access controller 240; and a transmission timing controller 250. Note that the names of the functional units used in FIG. 7 are merely examples, and other names may be used.

The transmitter 210 is configured to generate a lower layer signal from higher layer information, and to wirelessly transmit the signal. The receiver 220 is configured to wirelessly receive various types of signals, and to retrieve higher layer information from a received signal.

The configuration information manager 230 stores configuration information that is configured in advance, and stores the configuration information (the preamble format table and/or RACH Configuration table, the preamble format used for the random access and/or PRACH Configuration, etc.) to be dynamically and/or semi-statically configured by the base station 100, etc.

The random access controller 240 controls a random access procedure with the base station 100. When the user equipment 200 establishes a connection with the base station 100 or reestablishes synchronization with the base station 100 due to call origination or handover, etc., the random access controller 240 causes the transmitter 210 to transmit a preamble in accordance with the preamble format or the PRACH Configuration configured by the base station 100. Upon receiving the RAR from the base station 100, the random access controller 240 causes the transmitter 210 to transmit the RRC Connection Request.

<Hardware Configuration Example>

Note that the block diagrams used for the description of the above-described embodiment indicate blocks in units of functions. These functional blocks (components) can be implemented by any combination of hardware and/or software. Furthermore, a method for implementing each functional block is not particularly limited. Namely, each functional block may be implemented by a single device that is physically and/or logically connected; or may be implemented by a plurality of devices by directly and/or indirectly connecting (e.g., by a wire line and/or a radio link) two or more devices that are physically and/or logically separated.

Figure 8:
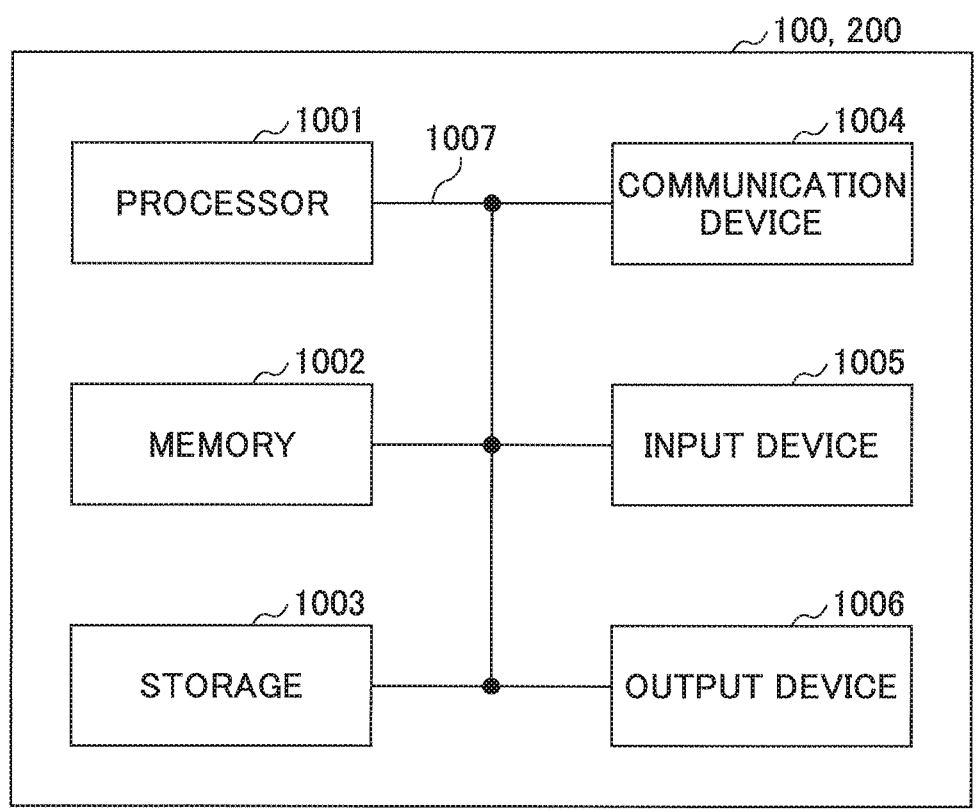
FIG. 8 is a diagram illustrating an example of a hardware configuration of the radio communication system according to the embodiment of the present invention.

For example, each of the base station, the user equipment, and so forth according to the embodiment of the present invention may function as a computer for executing the process of the random access method according to the present invention. FIG. 8 is a diagram illustrating an example of a hardware configuration of a radio communication device that is the base station 100 or the user equipment 200 according to the embodiment of the present invention. Each of the above-described base station 100 and the user equipment 200 may be physically configured as a computer device including a processor 1001; a memory 1002; a storage 1003; a communication device 1004; an input device 1005; an output device 1006; a bus 1007, and so forth.

Note that, in the following description, the term "apparatus" can be interchangeable with a circuit, a device, a unit, etc. The hardware configuration of each of the base station 100 and the user equipment 200 may be configured to include one or a plurality of devices illustrated in the drawings; or may be configured not to include a part of the devices.

After loading predetermined software (program) on hardware, such as the processor 1001 and the memory 1002, each function of the base station 100 and the user equipment 200 can be implemented by the processor 1001 by operating to control the communication by the communication device 1004 and/or reading out data and/or writing data in the memory 1002 and the storage 1003.

The processor 1001, for example, operates the operating system to control the entire computer. The processor 1001 may be formed of a central processing unit (CPU: Central Processing Unit) including an interface with a peripheral device; a control device; a processor; a register; and so forth. For example, the transmitter 110, the receiver 120, the configuration information manager 130, and the random access controller 140 of the above-described base station 100, or the transmitter 210, the receiver 220, the configuration information manager 230, the random access controller 240, and the transmission timing controller 250 of the user equipment 200 may be implemented by the processor 1001.

Furthermore, the processor 1001 reads out a program (program code), a software module, and/or data from the storage 1003 and/or the communication device 1004 onto the memory 1002, and executes various processes in accordance with these. As the program, a program may be used that causes a computer to execute at least a part of the operation described in the above-described embodiment. For example, the transmitter 110, the receiver 120, the configuration information manager 130, and the random access controller 140 of the above-described base station 100, or the transmitter 210, the receiver 220, the configuration information manager 230, the random access controller 240, and the transmission timing controller 250 of the user equipment 200 may be implemented by a control program that is stored in the memory 1002 and operated by the processor 1001; and, similarly, other functional blocks may be implemented. It is described that each of the above-described processes is executed by the single processor 1001; however, it can be simultaneously or sequentially executed by two or more processors 1001. The processor 1001 may be implemented by one or more chips. Here, the program may be transmitted from a network through an electric telecommunication line.

The memory 1002 may be a computer readable recording medium, and may be formed of, for example, at least one of a ROM (Read Only Memory), an EPROM (Erasable Programmable ROM), an EEPROM (Electrically Erasable Programmable ROM), a RAM (Random Access Memory), and so forth. The memory 1002 may be referred to as a register, a cache, a main memory (main memory device), and so forth. The memory 1002 can store a program (program code), a software module, and so forth that can be executed to implement the random access method according to the embodiment of the present invention.

The storage 1003 is a computer readable recording medium, and may be formed of, for example, at least one of an optical disk, such as a CD-ROM (Compact Disc ROM); a hard disk drive; a flexible disk; a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, and so forth. The storage 1003 may be referred to as an auxiliary storage device. The above-described storage medium may be, for example, a database including the memory 1002 and/or the storage 1003, a server, or another appropriate medium.

The communication device 1004 is hardware (transceiver device) for executing communication between computers through a wired network and/or a wireless network; and, for example, the communication device 1004 may also be referred to as a network device, a network controller, a network card, a communication module, and so forth. For example, each of the above-described transmitter 110, the receiver 120, the transmitter 210, the receiver 220, and so forth may be implemented by the communication device 1004.

The input device 1005 is an input device (e.g., a keyboard, a mouse, a microphone, a switch, a button, a sensor, etc.) for receiving an input from the outside. The output device 1006 is an output device (e.g., a display, a speaker, a LED lamp, etc.) for providing output to the outside. Here, the input device 1005 and the output device 1006 may be integrated (e.g., a touch panel).

Further, each of the devices, such as the processor 1001 and/or the memory 1002, is connected by a bus 1007 for communicating information. The bus 1007 may be formed of a single bus, or may be formed of buses that differ depending on a pair of devices.

Further, each of the base station 100 and the user equipment 200 may be formed to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part or all of the respective functional blocks may be implemented by the hardware. For example, the processor 1001 may be implemented by at least one of these hardware components.

Effect of the Embodiment of the Present Invention

According to the embodiment of the present invention, if a random access parameter differs depending on the frequency band, the overhead for signaling the random access parameter can be reduced or the testing can be reduced. For example, by storing the candidates of the parameter in a table format, etc., depending on the frequency band, and by selecting a table to be referred to depending on the frequency band, the overhead for signaling the random access parameter can be reduced, and the testing can be reduced.

By selecting, by the user equipment, a table depending on the frequency band, the signaling from the base station to the user equipment for selection of the table can be omitted, and the amount of the signaling can be reduced.

Note that, there is a case in which it is preferable to separately signal the preamble format and the PRACH Configuration so as to separately control the preamble format and the PRACH Configuration because the PRACH resource position, the resource number, and so forth may be affected as a result of the symbol length, the CP length, and so forth differing for each preamble format.

However, if there is dependence between the preamble format and the PRACH Configuration, and there may be a combination for which it is not useful to completely separately signal, the overhead for signaling can be reduced by including the preamble format in the PRACH Configuration.

ADDITIONAL EMBODIMENTS

Each aspect/embodiment described in this specification may be applied to LTE (long term evolution), LTE-A (LTE-advanced), SUPER 3G, MT-Advanced, 4G, 5G, FRA (future radio, W-CDMA (registered trademark), GSM (registered trademark), CDMA2000, UMB (ultra mobile broadband), IEEE 802.11 (Wi-Fi), IEEE 802.16 (WiMAX), IEEE 802.20, UWB (ultra-wideband), Bluetooth (registered trademark), any other systems using an appropriate system and/or next generation systems extended based on these systems.

The terms "system" and "network" used in this specification are interchangeably used.

The specific operation that is described in this specification to be performed by the base station may be performed by an upper node of the base station in some cases. In a network formed of one or more network nodes that includes a base station, it is clear that various operations to be performed for communication with a terminal can be performed by the base station and/or another network node other than the base station (for example, the MME or the S-GW can be considered; however, it is not limited to these). In the above, the case is exemplified where there is one network node other than the base station; however, a combination of a plurality of other network nodes (e.g., the MME and the S-GW) may be used.

Information, etc., can be output from an upper layer (or lower layer) to a lower layer (upper layer). Input/output may be executed through a plurality of networks.

The input/output information, etc., may be stored in a specific location (e.g., a memory); or may be maintained by a management table. The input/output information, etc., may be overwritten, updated, or appended. The output information, etc., may be deleted. The input information, etc., may be transmitted to another device.

Notification of information is not limited to the aspect/ embodiment described in the present specification, and may be performed by other methods. For example, notification of information may be performed via physical layer signaling (for example, DCI (Downlink Control Information) or UCI (Uplink Control Information)); upper-layer signaling (for example, RRC (Radio Resource Control) signaling, MAC (Medium Access Control) signaling, broadcast information (MIB (Master Information Block), or SIB (System Information Block)); other signals, or by a combination thereof. Furthermore, RRC signaling may be referred to as an RRC message; and the RRC signaling may be, for example, an RRC connection setup (RRC Connection Setup) message, an RRC connection reconfiguration (RRC Connection Reconfiguration) message, and so forth.

Determination may be made by a value represented by one bit (0 or 1); may be made by a Boolean value (Boolean: true or false); or may be made by comparison of numerical values (comparison with a predetermined value, for example).

Regardless of whether it is referred to as software, firmware, middleware, microcode, hardware description language, or another name, the software should be interpreted broadly so as to imply a command, a command set, a code, a code segment, a program code, a program, a subprogram, a software module, an application, a software application, a software package, a routine, a subroutine, an object, an executable file, an execution thread, a procedure, a function, and so forth.

Furthermore, software, a command, and so forth may be transmitted and received through a transmission medium. For example, when the software is transmitted from a Web site, a server, or another remote source using wired technology, such as a coaxial cable, an optical fiber cable, a twisted pair, and a digital subscriber line (DSL), and/or wireless technology, such as infrared, radio, and microwave, the wired technology and/or wireless technology is included within the definition of the transmission medium.

Information, signals, etc., described in the present specification may be represented using any of various other techniques. For example, data, instructions, commands, information, signals, bits, symbols, chips, and so forth, which may be described in the entire description, may be represented by voltage, current, electromagnetic waves, magnetic field or magnetic particles, optical field or photons, or any combination thereof.

Note that the terms described in this specification and/or the terms necessary for understanding this specification may be replaced with terms having the same or similar meaning. For example, the channel and/or symbol may be signaling (signal). Furthermore, a signal may be a message. Furthermore, a component carrier (CC) may be referred to as a carrier frequency, a cell, and so forth.

Furthermore, the information, parameters, and so forth, which are described in the specification, may be represented by absolute values; may be represented as relative values from predetermined values; or may be represented by any other corresponding information. For example, the radio resource may be indicated by an index.

The names used for the above-described parameters should not be interpreted restrictively in any way. Furthermore, mathematical expressions, etc., using these parameters may be different from the mathematical expressions explicitly disclosed in this specification. The various channels (e.g., PUCCH, PDCCH, etc.) and information elements (e.g., TPC) can be identified by any suitable name. Thus, the various names assigned to the various channels and information elements should not be interpreted restrictively in any way.

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

Any reference to elements using names, such as "first" and "second," which are used in this specification, does not generally limit the quantity or order of these elements. These names are used in the specification as a convenient method for distinguishing two or more elements. Accordingly, the reference to the first and second elements does not imply that only the two elements can be adopted here, or does not imply that the first element must precede the second element in any way.

As long as "include," "including," and the variations thereof are used in the specification and the claims, these terms are intended to be inclusive, similar to the term "comprising." Furthermore, it is intended that the term "or" used in this specification or the claims is not "exclusive OR."

Processing procedures, sequences, flowcharts, and so forth of each embodiment/modified example described in the specification may be exchanged as long as there is no contradiction. For example, for the methods described in the specification, the elements of the various steps are presented in an exemplary order and are not limited to a specific order presented.

Each aspect/embodiment described in the specification may be used alone; may be combined to be used; or may be switched in accordance with execution. Furthermore, notification of predetermined information (e.g., notification of "being X") is not limited to notification that is made explicitly; and the notification may be made implicitly (e.g., notification of the predetermined information is not performed).

The present invention is described in detail above; however, it is apparent to a person ordinarily skilled in the art that the present invention is not limited to the embodiments described in the present specification. The present invention can be implemented as modifications and alterations without departing from the sprit and scope of the present invention that are defined by the descriptions of the claims. Accordingly, an object of the description of this specification is for exemplification and illustration; and the description of this specification does not have any restrictive meaning to the present invention.

LIST OF REFERENCE SYMBOLS

100 base station
110 transmitter
120 receiver
130 configuration information manager
140 random access controller
200 user equipment
210 transmitter
220 receiver
230 configuration information manager
240 random access controller.

The invention claimed is:

1. A terminal comprising:
a receiver that receives an index indicating configuration information for configuring a resource to be used for random access from a base station;
a processor that selects one of a first candidate group and a second candidate group based on a frequency band, wherein the first candidate group and the second candidate group include a candidate for a resource and a preamble format to be used for random access; and
a transmitter that transmits a preamble using a preamble format corresponding to the index in the selected candidate group in a resource corresponding to the index in the selected candidate group,
wherein each of the first candidate group and the second candidate group includes, for each index, a parameter related to a number of physical random access channel (PRACH) time resources.

2. The terminal according to claim 1,
wherein each of the first candidate group and the second candidate group includes, for each index, a parameter indicating
a time position of a resource to be used for random access.

3. The terminal according to claim 1,
wherein at least some of preamble formats included in the first candidate group are different from preamble formats included in the second candidate group.

4. The terminal according to claim 1,
wherein a preamble format corresponding to an index in the first candidate group is different from a preamble format corresponding to the index in the second candidate group.

5. A base station comprising:
a transmitter that transmits an index indicating configuration information for configuring a resource to be used for random access to a terminal, wherein one of a first candidate group and a second candidate group is selected based on a frequency band, the first candidate group and the second candidate group including a candidate for a resource and a preamble format to be used for random access; and a receiver that receives a preamble using a preamble format corresponding to the index in the selected candidate group in a resource corresponding to the index in the selected candidate group, wherein each of the first candidate group and the second candidate group includes, for each index, a parameter related to a number of physical random access channel (PRACH) time resources.

6. A wireless communication system comprising: a terminal and a base station, wherein the terminal includes:
a first receiver that receives an index indicating configuration information for configuring a resource to be used for random access from the base station;
a processor that selects one of a first candidate group and a second candidate group based on a frequency band, wherein the first candidate group and the second candidate group include a candidate for a resource and a preamble format to be used for random access; and
a first transmitter that transmits a preamble using a preamble format corresponding to the index in the selected candidate group in a resource corresponding to the index in the selected candidate group, and wherein the base station includes:
a second transmitter that transmits the index indicating configuration information for configuring the resource to be used for random access to the terminal; and a second receiver that receives the preamble using the preamble format corresponding to the index in the selected candidate group in the resource corresponding to the index in the selected candidate group, and wherein each of the first candidate group and the second candidate group includes, for each index, a parameter related to a number of physical random access channel (PRACH) time resources.

7. A preamble transmission method of a terminal, the preamble transmission method comprising:

receiving an index indicating configuration information for configuring a resource to be used for random access from a base station;

selecting one of a first candidate group and a second candidate group based on a frequency band, wherein the first candidate group and the second candidate group include a candidate for a resource and a preamble format to be used for random access; and transmitting a preamble using a preamble format corresponding to the index in the selected candidate group in a resource corresponding to the index in the selected candidate group, wherein each of the first candidate group and the second candidate group includes, for each index, a parameter related to a number of physical random access channel (PRACH) time resources.

* * * * *